United States Patent [19]

Schmidt et al.

[11] Patent Number: 5,253,707
[45] Date of Patent: Oct. 19, 1993

[54] INJECTION WELL FRACTURING METHOD

[75] Inventors: Joseph H. Schmidt; James C. Abel, both of Anchorage, Ak.

[73] Assignee: Atlantic Richfield Company, Los Angeles, Calif.

[21] Appl. No.: 834,423

[22] Filed: Feb. 12, 1992

[51] Int. Cl.$^5$ .................... E21B 43/17; E21B 43/267
[52] U.S. Cl. .................... 166/270; 166/271; 166/273; 166/280; 166/308
[58] Field of Search ............ 166/270, 271, 273, 280, 166/300, 308

[56] References Cited

U.S. PATENT DOCUMENTS

| | | | |
|---|---|---|---|
| 2,859,819 | 11/1958 | Trott | 166/308 |
| 3,167,124 | 1/1965 | Graham | 166/308 X |
| 3,224,506 | 12/1965 | Huitt et al. | 166/308 X |
| 3,592,266 | 7/1971 | Tinsley | 166/308 X |
| 3,642,068 | 2/1972 | Fitch et al. | 166/308 X |
| 3,850,247 | 11/1974 | Tinsley | 166/308 X |
| 3,938,594 | 2/1976 | Rhudy et al. | 166/308 |
| 4,325,432 | 4/1982 | Henry | 166/271 X |
| 4,471,840 | 9/1984 | Lasseter et al. | 166/280 |
| 4,706,750 | 11/1987 | Buckles | 166/271 |
| 5,054,554 | 10/1991 | Pearson | 166/280 |

OTHER PUBLICATIONS

J. H. Hartsock et al, "The Effect of Mobility Ratio and Vertical Fractures on the Sweep Efficiency of a Five Spot", *Producers Monthly*, Sep. 1961, pp. 2-7.

Paul B. Venuto, "Tailoring for Processes to Geologic Environments", *World Oil*, Nov. 1989, pp. 61-68.

*Primary Examiner*—George A. Suchfield
*Attorney, Agent, or Firm*—Michael E. Martin

[57] ABSTRACT

Water injection wells are fractured by a proppant-laden fracturing fluid to create a propped fracture and wherein the proppant-laden fluid is followed by injection of a substantially proppant-free fluid so that the near wellbore portion of the fracture is free of proppant to minimize pressure drop during water injection and to produce higher injection rates for a given injection pressure. The fracture treatment may include the use of viscous fracturing and displacement fluids which are degraded by the injection of acid-bearing fluids at the end of the fracture treatment cycle. Stimulation or displacement liquid (water) injection may commence immediately after the fracture treatment and may be alternated with miscible gas injection.

8 Claims, No Drawings

INJECTION WELL FRACTURING METHOD

BACKGROUND OF THE INVENTION

1. Field of the Invention

The present invention pertains to a method for fracturing an earth formation to improve the injectivity of fluids through an injection well to enhance the production of oil and similar liquids from the formation.

2. Background

In oil fields which do not produce adequate flow of oil into producing wells, such as due to declining natural formation pressures, various stimulation techniques including water and other fluid injection processes are carried out. Typically, fluid injection wells are drilled at predetermined sites with respect to the producing wells so that the maximum sweep efficiency of oil or other formation fluids may be produced for a given amount of injected stimulation fluid. Additionally, as reservoir pressures decline certain selected production wells are converted to injection wells.

In order to maximize the amount of injected fluids at the lowest cost, certain formations require fracturing at the injection wells. However, conventional fracturing methods used for producing wells have been determined to not be suitable for many injection wells. For example, conventional practice for fracturing formations for producing wells includes mixing a proppant material, such as sand or other hard particulates, into the fracturing fluid so that the fractures or fissures opened in the formation are maintained in an open position after the fracture fluid pressure is relieved. In order to assure that the fracture does not close adjacent to the wellbore, enough proppant is injected to maintain proppant in the fracture at the near wellbore vicinity so that when fluid production commences, the fracture will not close or pinch off the flow of fluids into the well.

Moreover, to some extent it is undesirable to provide proppant in an injection well when the fluid injection pressure is greater than the formation fracture pressure because the presence of proppant in the fracture tends to interfere with the flow of injected fluids through the fracture and out into the formation. However, a completely unpropped fracture is not desirable since injection rates must be maintained at undesirably high levels to maintain fracture growth. Moreover, exposing a "clean" formation to injection fluids may be more easily accomplished in a propped fracture having relatively fixed dimensions than a fracture that is growing continuously from injected fluids.

The present invention provides an improved injection well fracturing method which overcomes the disadvantages and deficiencies of prior art practice including those mentioned above.

SUMMARY OF THE INVENTION

The present invention provides an improved method for fracturing an earth formation from a fluid injection well to improve the fluid injectivity rate without concomitant increase in fluid injection pressure, thereby increasing the rate of production fluids and extending the life of earth formations from which fluids are produced by pressure support of the formation with fluids including water and other fluid injection processes.

In accordance with an important aspect of the present invention, an earth formation in the vicinity of a water injection well is fractured to form the characteristic vertical two-winged fracture or similar fissures by a method which deposits some proppant material in the fracture near the distal end or tip thereof but leaves the fracture in the near wellbore region unpropped. In this way, fluid injectivity rates are maintained or increased without corresponding increases in injection pressures which would be encountered with fractures which contained proppant directly adjacent to the injection well.

In accordance with another important aspect of the present invention, a method of fracturing an earth formation adjacent to a fluid injection well is provided wherein the injected fluid pressure is not required to be increased to extend the fracture since an unpropped portion of the fracture is provided and is connected to a propped fracture portion for receiving injection fluid. Since the injection fluid pressure at the point of injection at the surface, and therefore the injection rate, is usually limited by the injection pump capability, the piping strength and flow resistance, the present invention results in substantially improved injection rates at a given maximum injection pressure at the surface when injecting at pressures above the formation fracture pressure. Furthermore, the injection well benefits from improved vertical conformity, that is fluid communication over a greater vertical extent of the region of interest in the formation, after the stimulation process.

Those skilled in the art will further appreciate the advantages and superior features of the present invention upon reading the description which follows.

DESCRIPTION OF A PREFERRED EMBODIMENT

In stimulating earth formations to improve the production of fluids therefrom, certain injection fluids such as miscible gas, water and other displacement fluids are injected into the formation through injection wells, which are placed in predetermined locations with respect to the fluid producing wells, so that the injection fluids may drive the formation fluids toward the producing wells. Clearly, the pumping costs for injecting the stimulation fluids should be minimized as much as possible. More importantly, perhaps, fluid production rate from a formation is balanced by the fluid injection rate. Therefore, a higher fluid injection rate will result in a proportionately higher rate of production of formation fluids. In this regard, a maximum rate of injection is usually desired at the lowest injection pressure at the wellhead to minimize pumping costs. In order to improve the injection rate through injection wells, the earth formation in the vicinity of the injection well is sometimes hydraulically fractured to provide lower resistance flow paths for the injected fluids, typically treated water and the like.

However, if a formation is fractured and the fracture is propped open in accordance with conventional production well hydraulic fracturing methods, the injection of proppant-laden fluid into the formation in the vicinity of the wellbore and the resultant deposition of proppant in the formation fracture in the vicinity of the wellbore is detrimental to injection fluid flow since the proppant provides fluid flow resistance and requires higher hydraulic pumping pressures for a given fluid injection rate or, for a given injection pressure at the wellhead, a reduced injection rate and produced fluid rate results.

Alternatively, injection wells may be hydraulically fractured without injecting proppant into the fracturing fluid but in such event pumping pressures must often be maintained sufficient to keep the entire fracture open at all times and these increased pressures may extend the fracture continuously. It is usually undesirable to extend the fracture too far into the formation in areas of closely-spaced producing wells since the fracture may break through to the producing well, thereby providing a short, lower-resistance flow path for the injection fluid and thereby ruining the preferred arrangement of providing a broad injection fluid front to sweep the formation fluids toward the production wells. Accordingly, a balanced condition is sought for fractured injection wells wherein the fracture is maintained at the desired length or distance from the injection well while minimizing pumping pressures and maximizing the rate of fluid injection to form a desirable flood front which sweeps the formation to drive the formation fluids towards the producing wells.

The present invention provides a method for fracturing injection wells which overcomes some of the defects and deficiencies mentioned hereinabove. In particular, a method is contemplated wherein a conventional vertical two-winged fracture or similar fractures (whatever the formation will react to) is formed to a predetermined distance from the injection wellbore and at least a portion of the fracture somewhat remote from the wellbore is propped open while the fracture in the near wellbore vicinity is maintained in an unpropped condition to minimize the resistance to flow of injection fluids from the wellbore through the propped and unpropped portions of the fracture and into the formation.

The method of the present invention includes the step of injecting fracturing fluids into a fluid injection well under sufficient pressure and injection rate to create fractures in the earth formation. The fracture fluid includes a quantity of proppant material entrained therein which is over-displaced with respect to the wellbore, that is the proppant material is carried sufficiently far into the fracture that essentially little or no proppant material remains in the formation or the fracture adjacent to the wellbore. Accordingly, a substantially vertical two-winged fracture, for example, will have a propped region of the fracture near the fracture distal end or tip, which is the farthest from the wellbore, but will have an unpropped portion of the fracture (both wings) adjacent to the wellbore. In this way, during fluid injection at pressures greater than the formation fracturing pressure, the resistance to fluid flow into the formation at the fracture is minimized at, and adjacent to, the casing perforations or, for an uncased well, the portion of the fracture which intersects the wellbore. However, a substantial portion of the fracture remains propped open so that fluid may leak off through the fracture faces into the formation at a sufficiently high rate and the fracture will not be continuously extended uncontrolled under high injection pressures.

The result of this type of fracture treatment is that the injection well may then be substantially continuously operated to inject fluids into the formation at injection rates which, for a given injection pressure, are higher than with either a fracture which is propped open throughout its radial extent from the wellbore or a completely unpropped fracture which is unstable and may continue to grow or close up if injection pressures are not maintained at a balanced condition.

EXAMPLE

A water injection well in the Prudhoe Bay, Alaska Oil Field is fractured by over-displacing the fracture treatment with a cross-linked fracturing fluid. The fracturing fluid may also be any conventional fracturing fluid such as gelled diesel, guar or hydroxy-propyl-guar (HPG). The fracturing fluid injection is followed by a weak acid injection acting as a fracture fluid breaker to facilitate the degradation of the fracturing fluid and the associated polymer residue. The breaker fluid may, for example, be hydrochloric, hydrofluoric or acetic acid or a combination thereof, or in accordance with the proppant material. Water injection may commence immediately following the displacement of the fracturing treatment into the formation. The detailed schedule of the fracturing treatment is shown in Table I as follows:

TABLE I

| (1) Fluid Type | (2) Stage Clean bbls | (3) Slurry bbls | (4) ppga | (5) Stage lbs | (6) Cum lbs | (7) Clean Rate | (8) Dirty Rate | (9) Prop lbs/min | (10) Stage Time | (11) Cum bbls |
|---|---|---|---|---|---|---|---|---|---|---|
| Prepad | 475 | 475 | — | — | — | 60.0 | 60 | — | 7.9 | 475 |
| 50# | 1785 | 1785 | — | — | — | 60.0 | 60 | — | 29.8 | 2260 |
| 50# | 95 | 103 | 2 | 7980 | 7980 | 55.1 | 60 | 4632 | 1.7 | 2363 |
| 50# | 119 | 135 | 3 | 14994 | 22974 | 53.0 | 60 | 6677 | 2.2 | 2498 |
| 50# | 119 | 140 | 4 | 19992 | 42966 | 51.0 | 60 | 8569 | 2.3 | 2638 |
| 50# | 119 | 145 | 5 | 24990 | 67956 | 49.2 | 60 | 10324 | 2.4 | 2783 |
| 40# | 143 | 181 | 6 | 36036 | 103992 | 47.4 | 60 | 11956 | 3.0 | 2964 |
| 40# | 143 | 187 | 7 | 42042 | 146034 | 45.8 | 60 | 13479 | 3.1 | 3151 |
| 40# | 143 | 193 | 8 | 48048 | 194082 | 44.4 | 60 | 14903 | 3.2 | 3345 |
| 40# | 143 | 206 | 10 | 60060 | 254142 | 41.6 | 60 | 17488 | 3.4 | 3551 |
| 40# | 143 | 143 | — | — | 254142 | 60.0 | 60 | — | 2.4 | 3488 |
| Acid | 36 | 36 | — | — | 254142 | 60.0 | 60 | — | 0.6 | 3524 |
| Flush | 402 | 402 | — | — | 254142 | 60.0 | 60 | — | 6.7 | 3926 |
| Totals | 3865 | 4132 | | | 254142 | | | | 68.9 | 4132 |

In the schedule table set forth above, column (1) indicates the fluid type. The "prepad" fluid contains no proppant. The numbered entries under column (1) indicate the pounds of polymer additive per thousand gallons of water used as the fracturing fluid. Column (4) indicates the number of pounds per gallon of fracture proppant material added to the fracturing fluid in column (2) to obtain the slurry volume in column (3). In column (7) the flow rate of liquid without proppant additive is indicated in barrels per minute. In column (8) the actual flow rate of fluid is indicated in barrels per minute.

The difference in water injection rate for a well treated according to the foregoing example is that for a fluid injection pressure of 2000 psig the injection rate is increased from approximately 18,000 barrels per day to approximately 33,000 barrels per day, for example.

One advantage of the present invention is that the injection of the liquid displacement fluid after the fracture has been formed may be alternated with injection of a miscible gas. Although liquid injection, such as water, improves the sweep efficiency of the reservoir fluid displacement process, the injection of a miscible gas removes residual oil from the formation, thereby increasing mobility of the flood front. A preferred process with alternate cycles of liquid injection and miscible gas injection is carried out by injecting the liquid at a pressure at the formation zone of interest greater than the formation fracture pressure so that the near wellbore unpropped portion of the fracture is opened and the liquid flows easily into and through the propped portion of the fracture and out into the formation. After a suitable liquid injection phase of the cycle, miscible gas is injected into the formation through the wellbore at pressures below the formation fracture pressure at the already-created fractures. In this way the near wellbore, unpropped portion of the fracture recloses and the injection gas is forced out into the formation over a broader area and does not enter the fracture itself. Avoiding injection of gas into the fracture prevents formation of a gas bubble in the propped portion of the fracture which would thereby reduce the desired process of wide area flooding of the formation with miscible gas. Accordingly, by injecting gas in alternate cycles between liquid injection at pressures below the formation fracture pressure, gas overrun into the propped fracture is minimized and the overall rate of produced fluids is increased.

Although a preferred embodiment of the present invention has been described in detail herein, those skilled in the art will recognize that various substitutions and modifications may be made to the method without departing from the scope and spirit of the appended claims.

What is claimed is:

1. A method for hydraulically fracturing an earth formation from a fluid injection well comprising the steps of:
    injecting a proppant-laden fracturing fluid into said earth formation through said well to create a propped fracture extending from said well;
    displacing said proppant-laden fracturing fluid with a substantially proppant-free fluid to provide an unpropped portion of said fracture adjacent said well; and
    injecting a liquid through said well at a pressure sufficient to open said unpropped portion of said fracture and into said fracture to stimulate the production of fluids from said formation.

2. The method set forth in claim 1 wherein:
    the step of displacing said proppant-laden fracturing fluid is carried out with a viscous fluid.

3. The method set forth in claim 2 wherein:
    said viscous fluid is selected from a group consisting of gelled diesel fuel, guar and HPG.

4. The method set forth in claim 3 including the step of:
    injecting a weak acid to degrade said viscous fluid.

5. The method set forth in claim 1 including the step of:
    alternating said liquid injection with injection of gas at pressures less than the formation fracturing pressure in the vicinity of said fracture.

6. A method for fracturing an earth formation from a fluid injection well comprising the steps of:
    injecting a proppant-laden fracturing fluid into said formation to provide a propped portion of said fracture having a distal end or tip disposed away from said well;
    injecting a substantially proppant-free liquid into said formation through said well to provide an unpropped portion of said fracture directly adjacent to said well;
    injecting a displacement liquid through said well at a pressure sufficient to open said unpropped portion of said fracture and into said fracture to stimulate the production of fluids from said formation; and
    alternating the injection of said displacement liquid with the injection of gas at a pressure less than the formation fracturing pressure in the vicinity of said fracture so that said unpropped portion of said fracture closes and said gas is forced into said formation bypassing said unpropped portion of said fracture.

7. A method for hydraulically fracturing an earth formation from a fluid injection well comprising the steps of:
    injecting a quantity of viscous liquid into said formation to extend a fracture to a predetermined distance from said well;
    injecting a quantity of proppant-laden fracturing liquid into said formation to create a propped portion of said fracture extending from said well;
    injecting a quantity of proppant-free liquid into said well to form an unpropped portion of said fracture adjacent to said well;
    injecting a fracture fluid breaker fluid into said well to degrade the liquid in said fracture; and
    injecting a displacement liquid through said well at a pressure sufficient to open said unpropped portion of said fracture and into said fracture to stimulate the production of fluids from said formation.

8. The method set forth in claim 7 including the step of:
    alternating the injection of displacement liquid with injection of miscible gas at a pressure less than the formation fracturing pressure in the vicinity of said unpropped portion of said fracture.

* * * * *